US012717377B2

(12) United States Patent
Nishizawa

(10) Patent No.: US 12,717,377 B2
(45) Date of Patent: Aug. 25, 2026

(54) POSITION INPUT APPARATUS

(71) Applicant: Wacom Co., Ltd., Saitama (JP)

(72) Inventor: Naoya Nishizawa, Saitama (JP)

(73) Assignee: Wacom Co., Ltd., Saitama (JP)

( * ) Notice: Subject to any disclaimer, the term of this patent is extended or adjusted under 35 U.S.C. 154(b) by 126 days.

(21) Appl. No.: 18/680,999

(22) Filed: May 31, 2024

(65) Prior Publication Data

US 2024/0319766 A1 Sep. 26, 2024

Related U.S. Application Data

(63) Continuation of application No. PCT/JP2022/046128, filed on Dec. 15, 2022.

(30) Foreign Application Priority Data

Jan. 26, 2022 (JP) ................................ 2022-010086

(51) Int. Cl.
*G06F 1/16* (2006.01)
*G06F 3/044* (2006.01)

(52) U.S. Cl.
CPC ............ *G06F 1/1607* (2013.01); *G06F 1/169* (2013.01); *G06F 3/044* (2013.01)

(58) Field of Classification Search
CPC ...... G06F 3/033; G06F 1/1626; G06F 1/1632; G06F 1/1656; G06F 1/166; G06F 1/1684; G06F 1/169
See application file for complete search history.

(56) References Cited

U.S. PATENT DOCUMENTS 5,677,827 A * 10/1997 Yoshioka .............. G06F 1/1632 429/97
6,195,513 B1 * 2/2001 Nihei ................. H04N 1/00278 396/335

(Continued)

FOREIGN PATENT DOCUMENTS

JP 10-229541 A 8/1998
JP 2019-67381 A 4/2019
JP 2020-204710 A 12/2020

OTHER PUBLICATIONS

International Search Report for International Patent Application No. PCT/JP2022/046128, mailed Jan. 31, 2023. (5 pages) (with English Translation).

*Primary Examiner* — Adrian S Wilson
(74) *Attorney, Agent, or Firm* — Seed Intellectual Property Law Group LLP

(57) ABSTRACT

Provided is a position input apparatus having a body portion and an extension portion. The body portion includes a body portion side surface with a thickness in a direction, and a screw hole provided on the body portion side surface, the extension portion includes a screw having a shaft provided with a screw thread corresponding to the screw hole and a head with a thickness in a center axis direction of the shaft, the screw is provided from inside of the extension portion such that the shaft protrudes outside from an extension portion side surface, and a head side surface of the screw is exposed to an upper surface side of the extension portion and is rotatable by a user, and the extension portion is attachable to the body portion by the screw being screwed to the screw hole on the body portion side surface.

10 Claims, 6 Drawing Sheets

(56) References Cited

U.S. PATENT DOCUMENTS

| | | | | |
|---|---|---|---|---|
| 7,623,121 | B2 * | 11/2009 | Dodge | G06F 3/0393<br>345/179 |
| 8,223,480 | B2 * | 7/2012 | Dong | H04M 1/05<br>455/575.8 |
| 9,110,629 | B2 * | 8/2015 | Leung | G06F 3/03545 |
| 9,327,544 | B2 * | 5/2016 | Ceruzzi | G06F 1/1628 |
| 9,971,379 | B2 * | 5/2018 | Griffin, II | G06F 1/1607 |
| 10,198,090 | B2 * | 2/2019 | Maeshima | G06F 1/1607 |
| 10,725,515 | B2 | 7/2020 | Marshall et al. | |
| D897,346 | S * | 9/2020 | Claudepierre | D14/440 |
| 10,802,617 | B2 * | 10/2020 | Lin | G06F 3/03545 |
| 11,068,023 | B1 * | 7/2021 | Manzano | G03B 11/04 |
| 11,531,370 | B2 * | 12/2022 | Liao | G06F 1/1607 |
| 11,910,081 | B2 | 2/2024 | Shiozaki | |
| 2006/0244737 | A1 * | 11/2006 | Dodge | G06F 3/0393<br>345/179 |
| 2008/0005423 | A1 * | 1/2008 | Jacobs | A61B 5/0002<br>710/62 |
| 2010/0021022 | A1 * | 1/2010 | Pittel | G06F 3/03545<br>206/320 |
| 2011/0285671 | A1 * | 11/2011 | Wu | G06F 3/0362<br>345/179 |
| 2012/0176321 | A1 * | 7/2012 | Kaye | G06F 3/046<br>345/169 |
| 2013/0301200 | A1 * | 11/2013 | Leung | G06F 1/1626<br>361/679.4 |
| 2013/0335903 | A1 * | 12/2013 | Raken | G06F 1/1656<br>361/679.4 |
| 2014/0029183 | A1 * | 1/2014 | Ashcraft | G06F 1/26<br>361/679.02 |
| 2019/0103764 | A1 * | 4/2019 | Marshall | G06F 1/166 |
| 2019/0146554 | A1 * | 5/2019 | Weldon | G06F 1/1696<br>361/679.43 |

* cited by examiner

POSITION INPUT APPARATUS

BACKGROUND

Technical Field

The disclosure relates to a position input apparatus such as what is called a tablet apparatus that allows a user to use an electronic pen, which is a pen-shaped operator, to input writing or drawing.

Description of the Related Art

The tablet apparatus is a plate-shaped electronic device, and a sheet-shaped position detection sensor including a sensor surface with a predetermined area is installed on the tablet apparatus. An upper surface side of the position detection sensor is an operation surface for receiving an instruction input by a user. The tablet apparatus allows the user to use an electronic pen or the like to perform a pointing operation on the operation surface to input writing or drawing. Examples of the tablet apparatus include what is called a liquid crystal tablet and what is called a plate tablet (plate-shaped tablet). The liquid crystal tablet is an input and output device including a display apparatus, such as a liquid crystal display (LCD), and a position detection sensor. The liquid crystal tablet allows the user to indicate and input a position of writing or drawing and can display input information. The plate tablet is an input device of a personal computer or the like including a position detection sensor, but not including a display apparatus such as an LCD. The plate tablet allows the user to indicate and input a position of writing or drawing.

An outer frame, like a picture frame, with a predetermined width in a direction parallel to the operation surface is provided around the operation surface of the tablet apparatus. The width of the outer frame of a conventional tablet apparatus is relatively wide, and a mount portion of an electronic pen or a device, such as a camera, can be provided on an upper surface of the outer frame part (surface parallel to the operation surface). However, there is a demand for widening the operation surface as much as possible without changing the size of the entire tablet apparatus, and the width of the outer frame provided around the operation surface is increasingly reduced. Therefore, the mount portion of the electronic pen or the like cannot be provided on the upper surface of the outer frame part around the operation surface. Under the circumstances, a technique for using a magnet to install an electronic pen on an outer frame side surface of a tablet apparatus and also charging the electronic pen is disclosed in Japanese Patent Laid-open No. 2019-67381.

The magnet is used to install the electronic pen on the outer frame side surface in the disclosure disclosed in Japanese Patent Laid-open No. 2019-67381, and the usability is significantly different from the usability of the technique for mounting the electronic pen on the mount portion provided on the outer frame upper surface. Although a magnet may be used to install the mount portion on the outer frame side surface, the mount portion is easily separated from the tablet apparatus if the magnet is weak, and stable use is difficult. In addition, the user may want to attach items other than the mount portion of the electronic pen to the outer frame part of the tablet apparatus. It is desirable that various items, such as an item for mounting and holding a thing to be used with the tablet apparatus and an item for expanding the function of the tablet apparatus, can be easily and firmly attached.

In view of the above, an object of the disclosure is to provide a tablet apparatus (position input apparatus) to which an extension portion, such as a mount portion of an electronic pen, can be easily and firmly attached.

BRIEF SUMMARY

To solve the problem, provided is a position input apparatus including a body portion including a position detection sensor and an operation surface, and an extension portion attachable to the body portion, in which the body portion includes a side surface with a thickness in a direction intersecting the operation surface, and a screw hole provided on the side surface of the body portion, the extension portion includes a screw having a shaft with a screw thread corresponding to the screw hole on the side surface of the body portion, and a head with a thickness in a center axis direction of the shaft, the screw extends from inside of the extension portion such that the shaft protrudes outside of the extension portion from a side surface of the extension portion, and a side surface of the head of the screw is exposed to a side of the extension portion including an upper surface and is rotatable by a user, and the extension portion is attached to the body portion by the screw being screwed into the screw hole on the side surface of the body portion.

The position input apparatus includes the body portion including the operation surface, and the extension portion to be attached to the body portion. The body portion includes the body portion side surface with a thickness in the direction intersecting the operation surface, and at least one screw hole is provided on the body portion side surface. Meanwhile, the extension portion includes the screw including the shaft provided with the screw thread corresponding to the screw hole on the body portion side surface, and the head with a thickness in the center axis direction of the shaft. The screw is provided from the inside of the extension portion such that the shaft protrudes outside of the extension portion from the extension portion side surface, and the head side surface of the screw is exposed to the upper surface side of the extension portion and is rotatable by the user. In this way, the screw of the extension portion can be screwed to the screw hole of the body portion side surface, and the extension portion can be easily and firmly attached to the body portion.

DETAILED DESCRIPTION

An embodiment of a tablet apparatus (position input apparatus) of the disclosure will be described with reference to the drawings. Although examples of the tablet apparatus include a liquid crystal tablet and a plate tablet as described above, an example of applying the disclosure to the liquid crystal tablet will be described in the embodiment described below. There are various types of input devices that include a tablet apparatus and an electronic pen, and, for example, input devices of electromagnetic resonance type and capacitance type are widely used. The disclosure can be applied to any type of tablet apparatus.

External Configuration of Tablet Apparatus (Position Input Apparatus)

Figure 1:
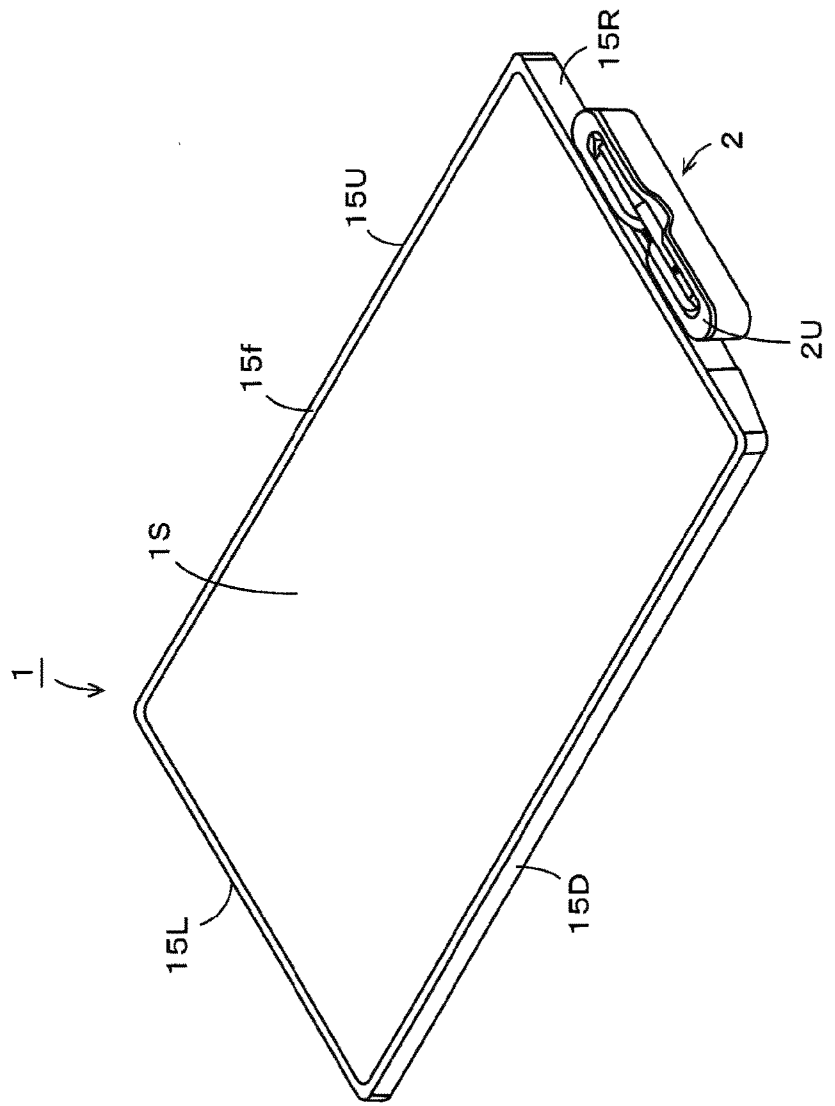
FIG. 1 is an external view of a tablet apparatus (position input apparatus) according to an embodiment.

FIG. 1 is an external view of the tablet apparatus (position input apparatus) of the embodiment. As illustrated in FIG. 1, the tablet apparatus of the embodiment includes a body portion 1 and an extension portion 2. The body portion 1 is a part that realizes a function of receiving, from a user, a position indication input (pointing operation) that is a writing input or a drawing input. The extension portion 2 is a part attached to the body portion 1 to improve the usability of the tablet apparatus or expand a function.

The body portion 1 is provided with a sheet-shaped position detection sensor, an LCD, and the like inside a body portion housing 15 formed in a tray shape by providing body portion side surfaces 15U, 15R, 15D, and 15L as side walls along edges of a rectangular bottom portion (bottom surface). As illustrated in FIG. 1, the body portion side surface 15U forms an upper side surface. The body portion side surface 15R forms a right side surface. The body portion side surface 15D forms a lower side surface. The body portion side surface 15L forms a left side surface. An upper surface of the body portion 1 forms an operation surface 1S, and the operation surface 1S receives a position indicated and input by the user using an electronic pen through the operation surface 1S. The body portion side surfaces 15U, 15L, 15D, and 15L have predetermined widths in a direction parallel to the operation surface 1S to form a frame portion 15*f* surrounding the operation surface 1S as a whole.

In the embodiment, the extension portion 2 is attached to the right side surface 15R of the body portion 1 for use as illustrated in FIG. 1. The extension portion 2 realizes a function of a pen holder for mounting the electronic pen. To facilitate the position indication input, the tablet apparatus may be diagonally tilted and mounted on a desk for use, or the user may use the tablet apparatus on the lap. Therefore, the extension portion 2 needs to be firmly attached to the body portion 1 to prevent the extension portion 2 from coming off easily. At the same time, the extension portion 2 needs to be easily attached to the body portion 1 when the user attaches the extension portion 2 to the body portion 1, and the extension portion 2 attached to the body portion 1 also needs to be able to be removed as necessary.

Therefore, a screw including a shaft with a relatively long diameter and a head can be used to attach the extension portion 2 to the body portion 1 in the tablet apparatus of the embodiment. By using the screw including the shaft with a relatively long diameter and the head, the user can turn the screw by his/her fingers alone without using a tool, such as a screw driver and a wrench, and the user can easily attach and remove the extension portion 2.

The operation surface 1S of the body portion 1, an upper surface of the frame portion 15*f* of the body portion 1, and an upper surface 2U of the extension portion 2 are positioned on the same plane in the tablet apparatus of the embodiment. Therefore, the upper surface 2U of the extension portion 2 is never positioned above the operation surface 1S, that is, the extension portion 2 is never provided so as to protrude with respect to the operation surface 1S. Thus, the extension portion 2 does not interfere with the position indication input. In other words, the tablet apparatus can be provided in a mode similar to a case in which the frame portion 15*f* is extended by the length of the extension portion 2. A configuration example of the body portion 1 and the extension portion 2 will be specifically described.

Configuration Example of Body Portion 1

Figure 2:
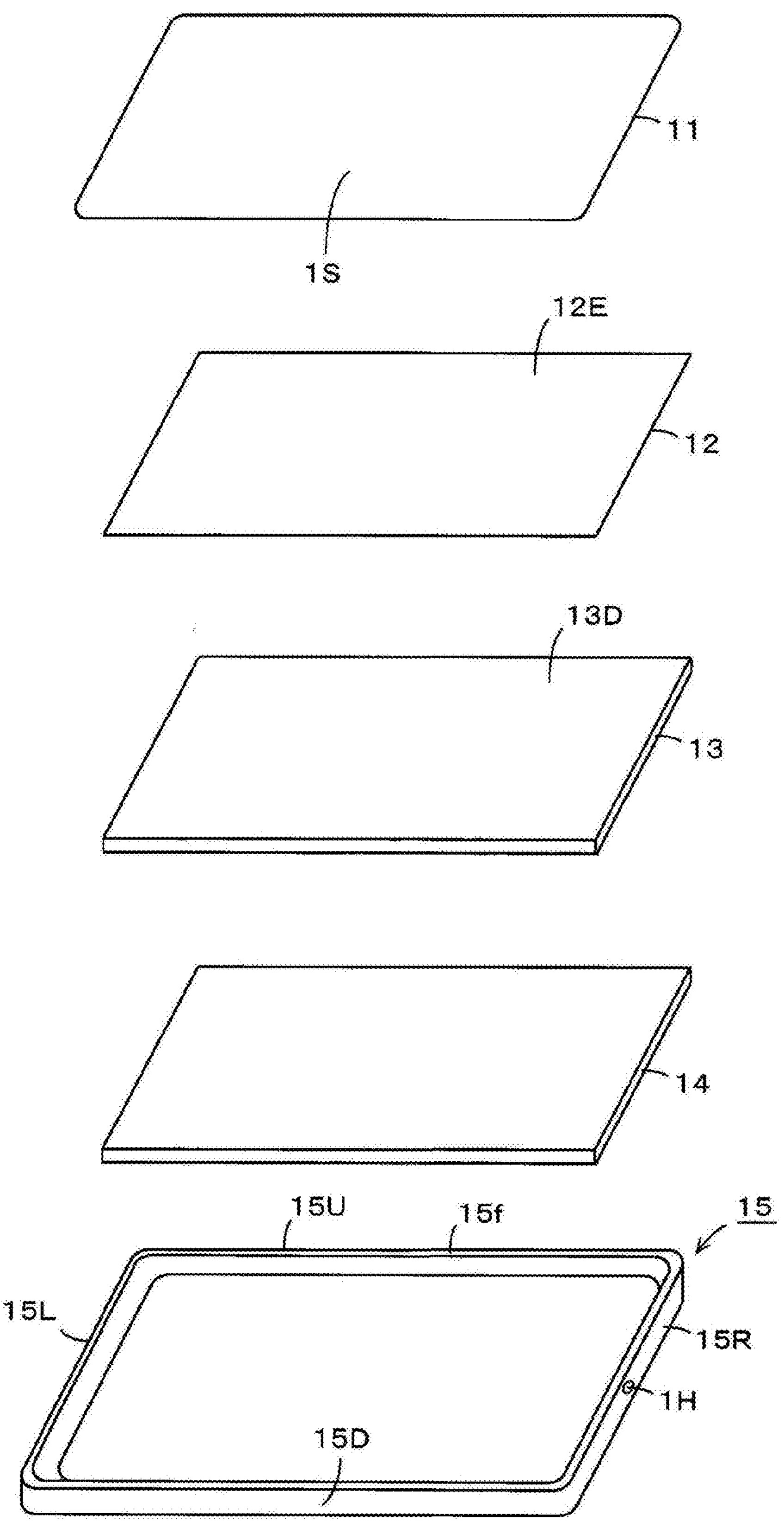
FIG. 2 is an exploded perspective view of a body portion of the tablet apparatus (position input apparatus) according to the embodiment.

FIG. 2 is an exploded perspective view of the body portion 1 of the tablet apparatus (position input apparatus) according to the embodiment. As illustrated in FIG. 2, the body portion 1 of the tablet apparatus includes a motherboard 14 housed in a lowermost layer in the tray-shaped body portion housing 15 including the body portion side surfaces 15U, 15R, 15D, and 15L provided along the edges of the rectangular bottom surface, and an LCD 13 is layered over the motherboard 14. A position detection sensor 12 is provided on a display screen 13D of the LCD 13. A front panel 11 is provided on an upper side of the position detection sensor 12. In this way, the motherboard 14, the LCD 13, and the position detection sensor 12 are housed in the body portion housing 15 and enclosed by the front panel 11 to form the body portion 1. Note that upper surfaces of the body portion side surfaces 15U, 15R, 15D, and 15L form the frame portion 15*f* of the operation surface 1S. As illustrated at the bottom of FIG. 2, a screw hole 1H described in detail later is provided near the center in the longitudinal direction of the right side surface 15R of the body portion housing 15.

Various circuits, such as a position detection circuit, a control circuit for the LCD 13, an interface circuit for connection to an external device, and a near field communication circuit, are installed on the motherboard 14 although not illustrated. The LCD 13 is connected to the control circuit for LCD of the motherboard 14, and the LCD 13 functions as a display unit of the body portion 1. The position detection sensor 12 is a sensor of capacitance type including what is called a transparent electrode. Therefore, an image going through the position detection sensor 12 and displayed on the display screen 13D of the LCD 13 positioned on a lower side of the position detection sensor 12 can be successfully viewed. The position detection sensor 12, along with the position detection circuit installed on the motherboard 14, forms a position detection apparatus. The front panel 11 contains, for example, tempered glass, and the front panel 11 is provided on the display screen of the LCD 13 so as to cover the sensor surface of the position detection sensor 12. An upper surface of the front panel 11 forms the operation surface 1S of the tablet apparatus of the embodiment.

As illustrated in FIG. 1, a detection area 12E of the position detection sensor 12 corresponds to the entire surface of the display screen 13D of the LCD 13. That is, a position on the display screen 13D always corresponds to a position on the detection area 12E of the position detection sensor 12. Therefore, any position indicated on the display screen 13D can be appropriately detected. The shape of the detection area 12E of the position detection sensor 12 is usually the same as the shape of the display screen 13D of the LCD 13, and the detection area 12E is slightly larger than the display screen 13D of the LCD 13.

Although the position detection sensor 12 of capacitance type is provided on an upper side of the LCD 13 as described with reference to FIG. 2, the configuration is not limited to this. A position detection sensor of electromagnetic resonance type may be provided on a lower side of the LCD 13 in place of the position detection sensor 12 of capacitance type. A position detection sensor of electromagnetic resonance type may be provided on the lower side of the LCD 13, and a position detection sensor of coupling type may be further provided on the upper side of the LCD 13 to form what is called a hybrid pen tablet including the position detection sensors of two different types.

Figure 3:
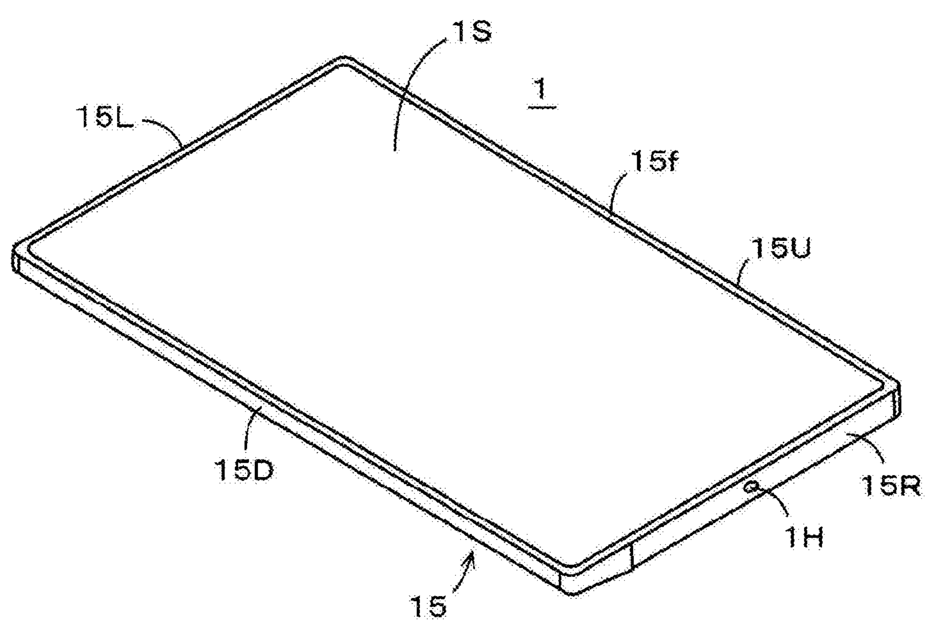
FIG. 3 is an external view of the body portion of the tablet apparatus (position input apparatus) according to the embodiment.
Figure 4:
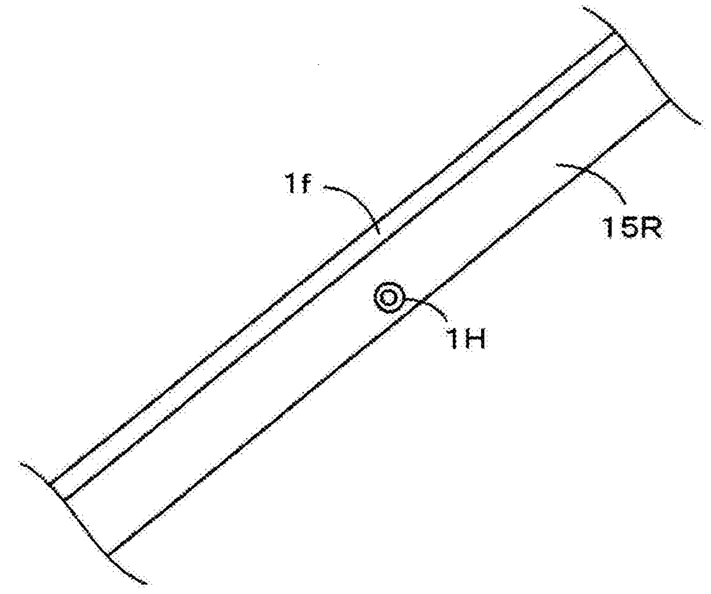
FIG. 4 is a diagram for describing main parts of the body portion of the tablet apparatus (position input apparatus) according to the embodiment.

FIG. 3 is an external view of the body portion 1 of the tablet apparatus (position input apparatus) according to the embodiment, and FIG. 4 is a diagram for describing main parts of the body portion 1 of the tablet apparatus (position input apparatus) according to the embodiment. As illustrated in FIG. 2 and as also illustrated in FIG. 3, the body portion 1 of the tablet apparatus is a rectangular plate-shaped body with a thickness as a whole. The body portion 1 of the tablet apparatus of the embodiment includes a screw hole 1H near the center in the longitudinal direction of the right side surface 15R of the tray-shaped body portion housing 15 as described above with reference to FIG. 2, as illustrated in FIG. 3, and as also illustrated in the enlarged view of FIG. 4. The body portion side surfaces 15U, 15R, 15D, and 15L form the frame portion **15*f* surrounding the operation surface 1S and have a thickness in the direction parallel to the operation surface 1S as also described above. The screw hole 1H is a through hole penetrating the right side surface 15R and reaching the inside of the body portion housing 15. The screw hole 1H is provided to fix the extension portion 2 to the body portion 1**.

Configuration Example of Extension Portion 2

Figure 5A:
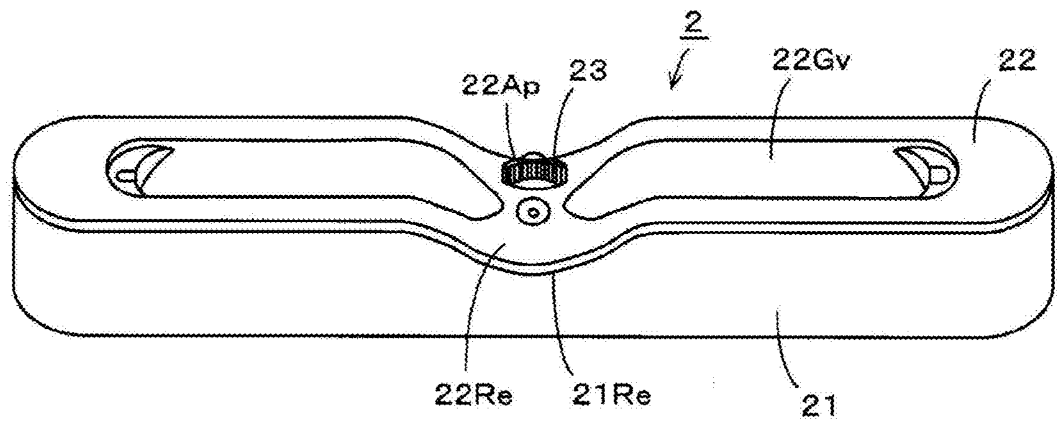
FIGS. 5A and 5B are diagrams for describing an appearance of an extension portion of the tablet apparatus (position input apparatus) according to the embodiment.
Figure 5B:
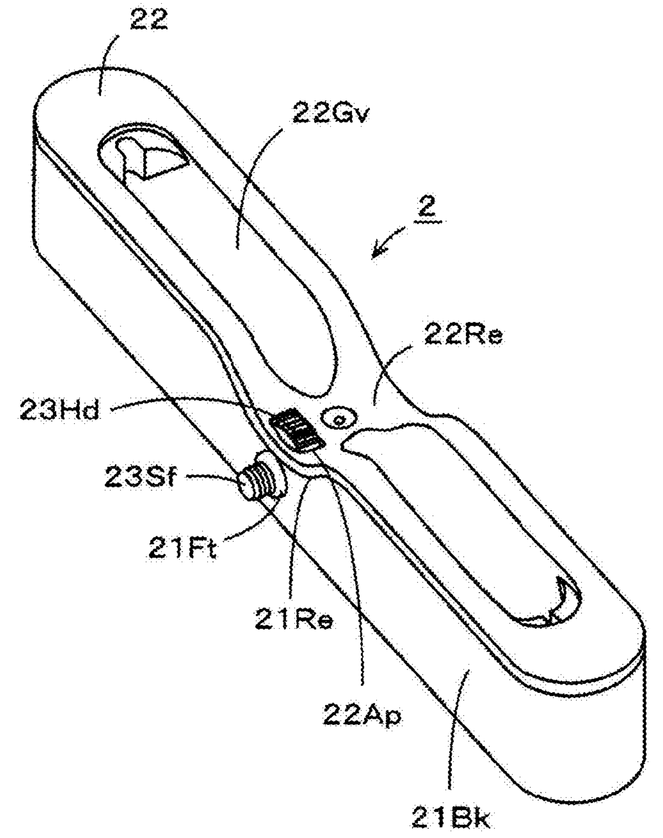

FIGS. 5A and 5B are diagrams for describing an appearance of the extension portion 2 of the tablet apparatus (position input apparatus) according to the embodiment. Specifically, FIG. 5A is a front side perspective view of the extension portion 2, and FIG. 5B is a back side perspective view of the extension portion 2. As illustrated in FIGS. 5A and 5B, the extension portion 2 includes an extension portion housing 21, a top plate 22, and a screw 23. Both ends in the longitudinal direction of the extension portion housing 21 are formed in an arc shape as illustrated in FIGS. 5A and 5B, and a center part in the longitudinal direction of the extension portion housing 21 is recessed to form a housing recessed portion 21Re. The extension portion housing 21 has a predetermined thickness (depth) in a direction orthogonal to the longitudinal direction of the extension portion housing 21, which is a direction parallel to a side surface of the extension portion housing 21. As described in detail later, the extension portion housing 21 is a box-shaped body including a space inside and including an upper surface that is an opening.

As illustrated in FIGS. 5A and 5B, the top plate 22 is a plate-shaped body that covers the upper surface opening of the extension portion housing 21. Both ends in the longitudinal direction of the top plate 22 are formed in an arc shape so as to coincide with the upper surface of the extension portion housing 21, and a center part in the longitudinal direction of the top plate 22 is recessed to form a top plate recessed portion 22Re. The top plate recessed portion 22Re at the center part in the longitudinal direction of the top plate 22 includes an operation opening 22Ap through which a side surface of a head 23Hd of the screw 23 described later protrudes. Top plate groove portions 22Gv as a place for the electronic pen are also provided at the center part in the longitudinal direction of an upper surface of the top plate 22. As illustrated in FIG. 5A, the top plate recessed portion 22Re is provided at the center part in the longitudinal direction of the top plate 22, and the top plate groove portions 22Gv are provided on the left and right of the top plate recessed portion 22Re. Note that the shape of the top plate groove portions 22Gv allows the user to mount the electronic pen with the pen tip facing either side.

The screw 23 includes a shaft 23Sf including a screw thread; and the head 23Hd. As illustrated in FIG. 5B, the screw 23 is provided at a center part in the longitudinal direction of the extension portion 2 (part that is the housing recessed portion 21Re) and is provided from the inside such that the shaft 23Sf protrudes outside from a housing back surface 21Bk of the extension portion housing 21. The side surface of the head 23Hd of the screw 23 includes, in the axial direction, a large number of grooves for preventing slipping. As illustrated in FIGS. 5A and 5B, part of the grooves protrudes and emerge from the operation opening 22Ap of the top plate 22, and the user can rotate the head 23Hd.

Note that, as illustrated in FIGS. 5A and 5B, the screw 23 is provided at the part of the housing recessed portion 21Re of the extension portion housing 21, and part of the side surface of the head 23Hd of the screw 23 protrudes from the operation opening 22Ap on the upper surface of the top plate recessed portion 22Re of the top plate 22. However, the side surface of the head 23Hd protruding from the operation opening 22Ap is positioned on a lower side of the part other than the top plate recessed portion 22Re of the top plate 22 (bottom surface side of the extension portion housing 21). That is, the side surface of the head 23Hd of the screw 23 does not protrude from a plane including the operation surface 1S of the body portion 1 of the tablet apparatus. Therefore, the head 23Hd of the screw 23 of the extension portion 2 does not interfere with the position indication input using the electronic pen.

A ring-shaped housing protruding portion 21Ft is provided from a back surface of the extension portion housing 21 toward the outside, around the hole from which the shaft 23Sf of the screw 23 on the back surface protrudes. The housing protruding portion 21Ft is a part to be fitted to a recessed portion provided around the opening of the screw hole 1H of the body portion 1 of the tablet apparatus. This allows the user to set the extension portion 2 at a correct position relative to the body portion 1 and use the screw 23 to attach the extension portion 2 to the body portion 1.

Figure 6A:
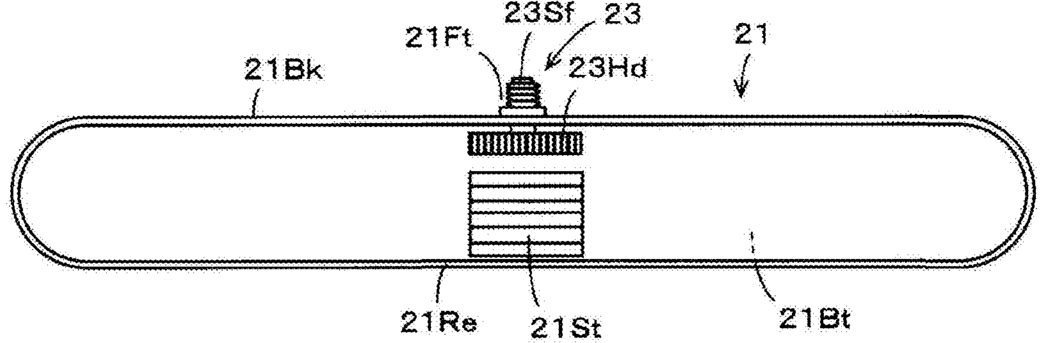
FIGS. 6A, 6B, and 6C are exploded views of the extension portion of the tablet apparatus (position input apparatus) according to the embodiment.
Figure 6B:
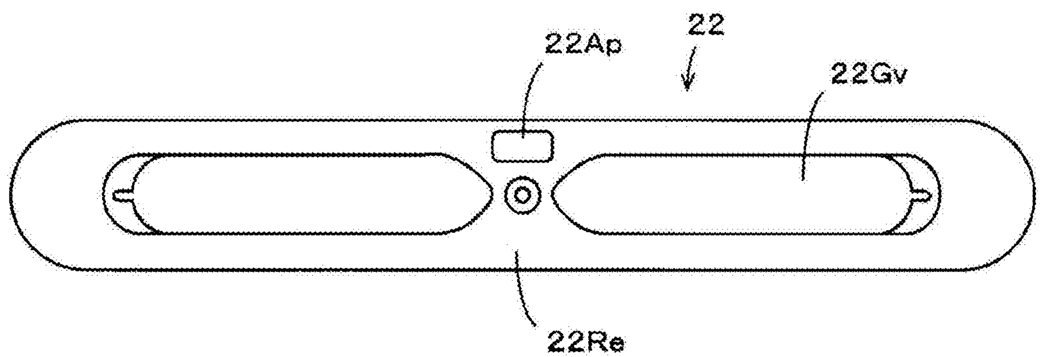
Figure 6C:
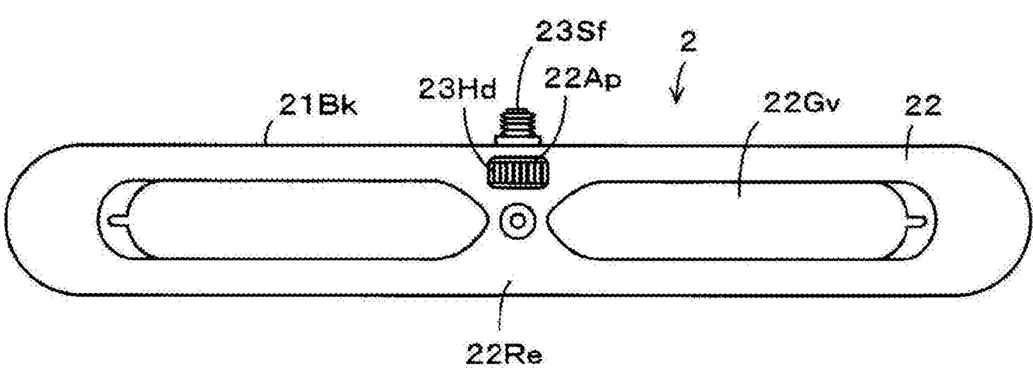

FIGS. 6A, 6B, and 6C are top views of the extension portion housing 21, the top plate 22, and the extension portion 2 of the tablet apparatus (position input apparatus) of the embodiment, respectively. As illustrated in the top view of the extension portion housing 21 of FIG. 6A, the extension portion housing 21 has a box shape formed by providing side walls (side surfaces) along edges of an extension portion housing bottom surface 21Bt in which both ends in the longitudinal direction are formed in an arc shape. Note that, as described with reference to FIGS. 5A and 5B, the center part in the longitudinal direction of the extension portion housing 21 is the housing recessed portion 21Rc. As illustrated in FIG. 6A, the screw 23 is provided at the center part in the longitudinal direction of the extension portion housing 21 such that the shaft 23Sf penetrates the housing back surface 21Bk and protrudes from the inside of the extension portion housing 21. Therefore, the head 23Hd of the screw 23 is positioned on a back surface side inside the extension portion housing 21, at the center part in the longitudinal direction. The housing protruding portion 21Ft is formed around the shaft 23Sf of the housing back surface 21Bk from which the shaft 23Sf protrudes.

In the embodiment, a core body housing portion (core holder) 21St of the electronic pen is provided on an upper surface side of the head 23Hd of the screw 23 (opposite side of the shaft 23Sf), at the center part in the longitudinal direction inside the extension portion housing 21 as illustrated in FIG. 6A. There is a space inside the extension portion housing 21, and therefore, a core body of the electronic pen and various other items, such as replaceable parts of the electronic pen, can be stored.

The top plate 22 is a plate-shaped body that covers the upper surface opening of the extension portion housing 21, and both ends in the longitudinal direction of the top plate 22 are formed in an arc shape so as to coincide with the upper surface of the extension portion housing 21, as described above and as also illustrated in the top view of the top plate 22 in FIG. 6B. As described with reference to FIGS. 5A and 5B, the center part in the longitudinal direction of the top plate 22 is the top plate recessed portion 22Re corresponding to the housing recessed portion 21Re of the extension portion housing 21. The part of the top plate recessed portion 22Re at the center in the longitudinal direction of the top plate 22 is provided with the operation opening 22Ap through which the side surface of the head 23Hd of the screw 23 protrudes as illustrated in FIG. 6B. The top plate groove portions 22Gv that are a place for the electronic pen is provided in the longitudinal direction on an upper surface of the top plate 22.

The top plate 22 illustrated in FIG. 6B can be mounted so as to cover the upper surface of the extension portion housing 21 illustrated in FIG. 6A to thereby form the extension portion 2 including the extension portion housing 21, the top plate 22, and the screw 23 as illustrated in FIG. 6C. In this case, the shaft 23Sf of the screw 23 protrudes from the housing back surface 21Bk, and part of the side surface of the head 23Hd of the screw 23 is exposed from the operation opening 22Ap of the top plate 22. The user uses the screw 23 included in the extension portion 2 to install, on the body portion 1, the extension portion 2 configured in this way.

Connection (Attachment) of Extension Portion 2 to Body Portion 1

Figure 7A:
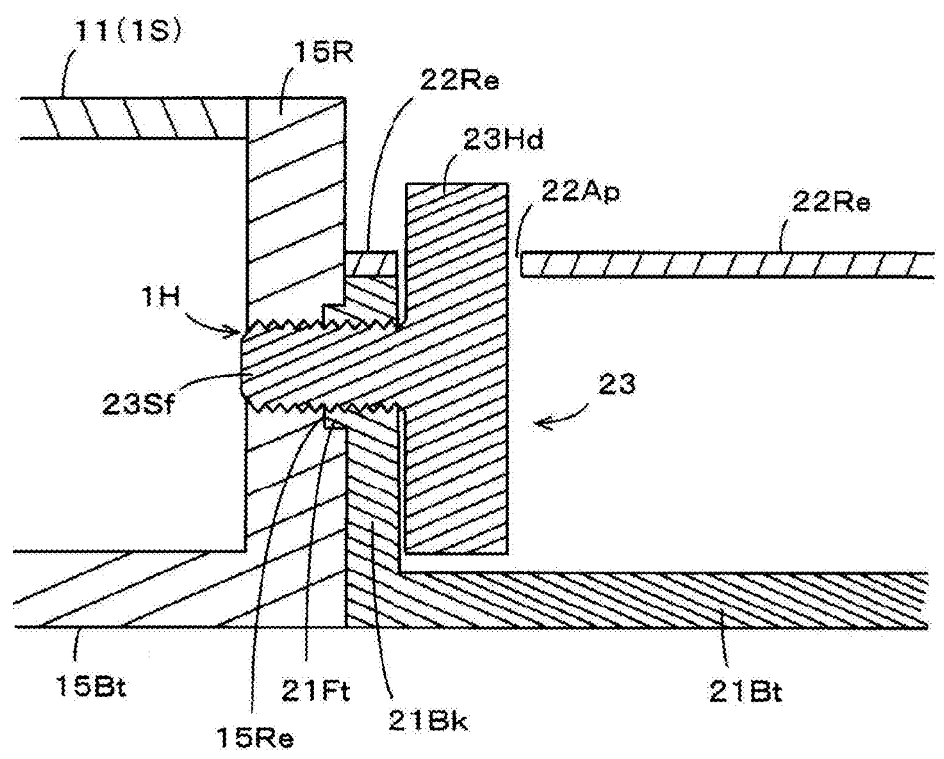
FIGS. 7A and 7B are cross-sectional views of a part where the extension portion is connected to the body portion of the tablet apparatus (position input apparatus) according to the embodiment.
Figure 7B:
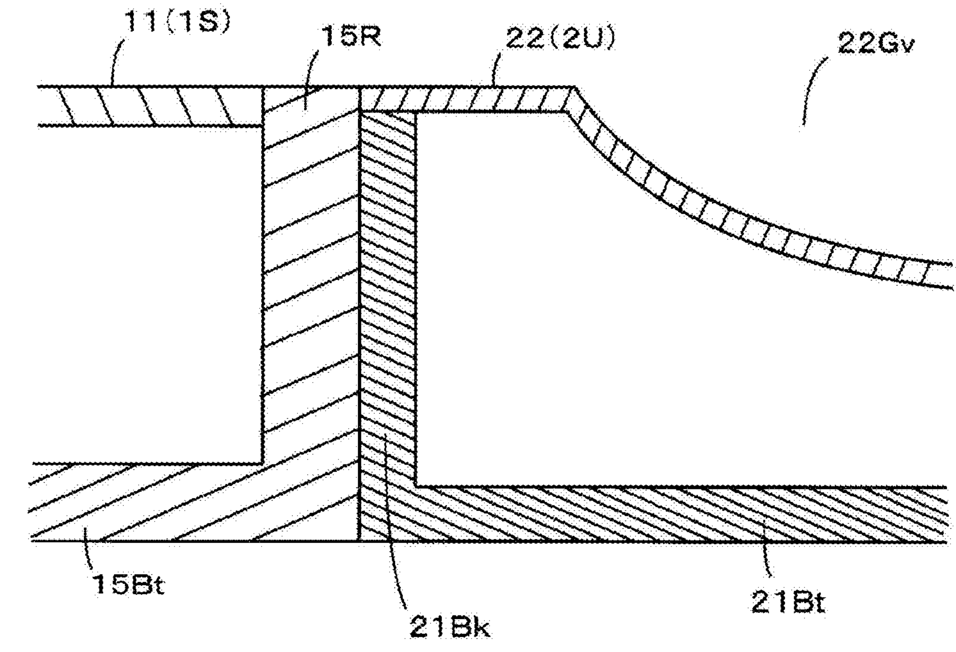

FIGS. 7A and 7B are cross-sectional views of a part where the extension portion 2 is connected to the body portion 1 of the tablet apparatus (position input apparatus) according to the embodiment. Specifically, FIG. 7A is a cross-sectional view of the center part in the longitudinal direction of the extension portion 2 provided with the screw 23 (part of the housing recessed portion 21Re and the top plate recessed portion 22Rc), and FIG. 7B is a cross-sectional view of a part provided with the top plate groove portions 22Gv of the top plate 22 that is a part other than the center part.

As described with reference to FIGS. 2 to 4, the right side surface 15R of the body portion 1 of the tablet apparatus according to the embodiment is provided with the screw hole 1H corresponding to the shaft 23Sf of the screw 23 provided on the extension portion 2. Therefore, to attach the extension portion 2 to the body portion 1, the shaft 23Sf of the screw 23 protruding from the housing back surface 21Bk of the extension portion 2 is inserted into the screw hole 1H provided on the right side surface 15R of the body portion 1 as illustrated in FIG. 7A. Subsequently, the side surface of the head 23Hd of the screw 23 exposed from the operation opening 22Ap of the top plate 22 is rotated clockwise by the pad of a finger of the user or the like. As a result, the shaft 23Sf of the screw 23 is screwed to the screw hole 1H of the body portion 1.

In this case, the housing back surface 21Bk of the extension portion 2 approaches the right side surface 15R of the body portion 1 in association with the rotation of the screw 23, and the housing protruding portion 21Ft of the housing back surface 21Bk of the extension portion 2 is fitted to the recessed portion 15Re of an outer opening part of the screw hole 1H provided on a right side surface of the body portion 1. By rotating the screw 23 until the screw 23 cannot be rotated clockwise, the right side surface 15R of the body portion 1 and the housing back surface 21Bk of the extension portion 2 come into close contact with each other, and the extension portion 2 is fixed to the body portion 1 as illustrated in FIG. 7A. This can provide the tablet apparatus in the mode illustrated in FIG. 1.

In this way, the extension portion 2 can be easily fixed to the body portion 1 with just one screw 23 to form the tablet apparatus illustrated in FIG. 1 in which the body portion 1 and the extension portion 2 are integrated. In this case, the screw 23 of the extension portion 2 is attached to the recessed portion part of the extension portion 2 (part of the housing recessed portion 21Re and the top plate recessed portion 22Re) as illustrated in FIG. 7A, and the part on the side surface side of the head 23Hd of the screw 23 does not protrude with respect to the operation surface 1S of the body portion 1. Therefore, the head 23Hd of the screw 23 does not interfere with the position indication input.

As illustrated in FIG. 7B, the operation surface 1S of the body portion 1 and the part other than the top plate groove portions 22Gv in the top plate 22 of the extension portion 2 are positioned on the same plane at the part other than the recessed portion part in the extension portion 2 (part other than the housing recessed portion 21Re and the top plate recessed portion 22Re). That is, the upper surface 2U of the extension portion 2 does not protrude to the upper side with respect to the operation surface 1S as also illustrated in FIG. 1. Therefore, the extension portion 2 does not interfere with the position indication input when the extension portion 2 is installed on the body portion 1.

Note that, in the case of the tablet apparatus of the embodiment, a body portion housing bottom surface 15Bt and the extension portion housing bottom surface 21Bt are also positioned on the same plane as illustrated in FIGS. 7A and 7B. Therefore, the operation surface 1S of the tablet apparatus is not tilted even when the bottom surface of the tablet apparatus of the embodiment is placed flat so as to face a plane such as a desk.

Assume that the extension portion 2 installed on the body portion 1 is no longer necessary after the extension portion 2 is attached to the body portion 1 to form the tablet apparatus in the mode illustrated in FIG. 1 as described with reference to FIGS. 7A and 7B. In this case, the side surface of the head 23Hd of the screw 23 of the extension portion 2 can be operated and rotated counterclockwise to pull out the shaft 23Sf of the screw 23 of the extension portion 2 from the screw hole 1H of the body portion 1. That is, the extension portion 2 fixed to the body portion 1 can also be easily removed.

Size of Screw 23

The size of the screw 23 can be an appropriate size according to the height, the thickness, and the like of the right side surface 15R of the body portion 1. Specifically, the diameter of the shaft 23Sf of the screw 23 can be an appropriate size according to the height of the right side surface 15R of the body portion 1 (length of the right side surface 15R in the direction orthogonal to the operation surface 1S). For example, if the height of the right side surface of the body portion 1 is equal to or greater than 10 mm (millimeters), the diameter of the shaft 23Sf of the screw 23 can be, for example, approximately ¼ inches (6.35 mm). Therefore, the screw hole 1H provided on the right side surface of the body portion 1 also corresponds to this. In this way, the extension portion 2 can be firmly attached to the body portion 1. That is, the screw 23 may be what is called a camera screw.

The length in the axial direction of the shaft 23Sf of the screw 23 can be an appropriate size according to the thickness of the right side surface 15R of the body portion 1 (length of the right side surface 15R in the direction parallel to the operation surface 1S). For example, if the thickness of the right side surface 15R of the body portion 1 is 4.5 mm, the length in the axial direction of the shaft 23Sf of the screw 23 can be set such that the maximum length of the protrusion from the housing back surface 21Bk of the extension portion housing 21 of the shaft 23Sf is approximately 4.5 mm. In other words, the length in the axial direction of the shaft 23Sf of the screw 23 can be approximately a length that allows the shaft 23Sf to penetrate the right side surface 15R of the body portion 1.

Obviously, in a case where the thickness of the right side surface 15R of the body portion 1 is equal to or greater than 10 mm, the shaft 23Sf may not penetrate the right side surface 15R, and it is preferable that the length of the shaft 23Sf of the screw 23 at the part screwed to the screw hole 1H of the right side surface 15R of the body portion 1 be approximately equal to or greater than 4 mm. In this way, for the stable function of the screw 23, the screw 23 can be what is called a camera screw or other screws, in which the diameter of the shaft 23Sf is equal to or smaller than ¼ inches, and the length in the axial direction of the shaft 23Sf is equal to or smaller than 4.5 mm.

Note that there is a trend that the height of the side surface of the body portion 1 of the tablet apparatus (length in the direction orthogonal to the operation surface 1S) is made small, and there is a tablet apparatus with a thickness of equal to or smaller than 10 mm. Therefore, the diameter of the head 23Hd of the screw 23 can be a length equal to or smaller than the height of the side surface of the body portion 1 of the tablet apparatus, preferably, equal to or smaller than 80 percent of the height of the side surface. There is also a trend that the thickness of the side surface of the body portion 1 of the tablet apparatus (length in the direction parallel to the operation surface 1S) is made small. Therefore, the length in the axial direction of the shaft 23Sf of the screw 23 can be approximately a length that allows the shaft 23Sf to penetrate the side surface of the body portion 1. However, if the firm fixation is not possible due to the thin side surface, a reinforcing member including a screw hole to be engaged with the shaft 23Sf of the screw 23 can be fixed and provided inside the body portion 1 of the tablet apparatus, for example. In this way, the diameter of the shaft 23Sf of the screw 23 can also be determined according to the diameter of the head 23Hd of the screw 23, the height of the side surface of the body portion 1 of the tablet apparatus, whether or not there is a reinforcing member, and the like.

Effects of Embodiment

According to the tablet apparatus of the embodiment, the extension portion 2 can be easily and firmly attached to the body portion 1 with just one screw 23 to realize the tablet apparatus including the body portion 1 and the extension portion 2. The extension portion 2 attached to the body portion 1 can also be easily removed by the operation of loosening the screw 23.

Modifications

Other Examples of Extension Portion

The extension portion 2 of the embodiment is a pen holder including the extension portion housing 21, the top plate 22, and the screw 23, and the top plate is provided with the groove portions (recessed portions) 22Gv. However, the extension portion 2 is not limited to this. For example, the top plate 22 may not be provided, and the electronic pen may be directly housed in the box-shaped extension portion housing 21 in which the upper surface is an opening. In this case, the extension portion 2 includes the extension portion housing 21 and the screw 23.

The extension portion is not limited to the pen holder. For example, an extension portion with a larger upper surface that supports a terminal may also be attached in order to mount another terminal apparatus, such as a smartphone and a tablet personal computer (PC). An extension portion that realizes a function of a bookrest for holding and easily viewing what is called a storyboard (shooting script), a draft drawing, or the like or an extension portion including an extended function, such as a camera module and a microphone, may also be attached as in the case of the embodiment. That is, the extension portion that can be attached to the body portion 1 may be various extension portions, such as an extension portion that supports another terminal and various articles, an extension portion that holds a storyboard and other articles, and an extension portion including an extended function.

Note that a digital interface (hereinafter, referred to as a "digital I/F") may be necessary to connect the terminal mounted on the extension portion or the extension portion including the extended function, such as a camera module, to the body portion 1. In this case, a digital I/F cable can be used to connect the terminal mounted on the extension portion or the extension portion including the extended function, such as a camera module, to the body portion.

To connect the extension portion including the extended function to the body portion, a socket of the digital I/F may be provided on the body portion side, and a plug of the digital I/F may be provided on the extension portion side to directly connect the body portion and the extension portion, for example. In this case, both the connection through the digital I/F and the connection through the screw can be used for firmer connection (attachment).

Although the extension portion 2 is attached to the body portion 1 with one screw 23 in the embodiment, the configuration is not limited to this. For firmer connection, a plurality of screws may be used to connect the extension portion 2 to the body portion 1. In this case, the plurality of screws need to be provided on the extension portion 2 such that shafts protrude from the inside to the back surface. Accordingly, a plurality of screw holes need to be provided on the right side surface of the body portion 1.

The thickness of the extension portion 2 (length (height) in the direction orthogonal to the upper surface) may be greater than the thickness of the body portion 1 (length in the direction orthogonal to the operation surface 1S). In this case, the extension portion 2 and the body portion 1 can be connected such that the operation surface 1S of the body portion 1 and the upper surface of the extension portion 2 are positioned on the same plane, and the extension portion housing bottom surface 21Bt protrudes downward with respect to the body portion housing bottom surface 15Bt. That is, the extension portion 2 can have various shapes and sizes.

Position of Attaching Extension Portion to Body Portion

Although the extension portion 2 is connected (attached) to the right side surface 15R of the body portion 1 in the description of the embodiment, the configuration is not limited to this. Specifically, if screw holes corresponding to the screw 23 are also provided on the upper side surface 15U, the lower side surface 15D, and the left side surface 15L of the body portion 1, the extension portion 2 can also be connected to the upper side surface 15U, the lower side surface 15D, and the left side surface 15L. A plurality of screw holes can also be provided on each of the upper side surface 15U, the lower side surface 15D, and the left side surface 15L as in the case of the right side surface 15R.

Therefore, the extension portion 2 can be obviously connected to each of the upper side surface 15U, the right side surface 15R, the lower side surface 15D, and the left side surface 15L of the body portion 1, or different extension portions may be connected to them. Obviously, the side surfaces may be used differently, such as connecting an extension portion with a bookrest function to the upper side surface 15U, connecting extension portions with a pen holder function to the right side surface 15R and the left side surface 15L, and not connecting an extension portion to the lower side surface 15D.

OTHER EXAMPLES

Although the front panel 11 is fitted from the upper surface of the body portion housing 15 in the body portion 1 as illustrated in FIGS. 7A and 7B, the configuration is not limited to this. The front panel 11 may be mounted on the upper surface of each of the upper side surface 15U, the right side surface 15R, the lower side surface 15D, and the left side surface 15L of the body portion housing 15. In any case, it is necessary to prevent the front panel 11 from easily coming off from the body portion housing 15.

Although the top plate 22 is mounted on the upper surface of the side surface of the extension portion housing 21 in the extension portion 2 as illustrated in FIGS. 7A and 7B, the configuration is not limited to this. The top plate 22 may be fitted from the upper surface of the extension portion housing 21. In any case, it is necessary to prevent the top plate 22 from easily coming off from the extension portion housing 21.

Although the body portion 1 is the liquid crystal tablet including the LCD 13 in the example described in the embodiment, the body portion 1 is not limited to this. This disclosure can also be applied to what is called a plate tablet not including a display unit such as an LCD. Note that the display unit is not limited to the LCD, and, for example, a thin display unit (display device), such as an organic electroluminescence (EL) display, may be included.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A position input apparatus comprising:

a body portion including a position detection sensor and an operation surface; and an extension portion attachable to the body portion, wherein the body portion includes:

a side surface with a thickness in a direction intersecting the operation surface, and a screw hole on the side surface of the body portion, wherein the extension portion includes:

a screw having a shaft with a screw thread corresponding to the screw hole on the side surface of the body portion, and a head with a thickness in a center axis direction of the shaft, wherein the screw extends from inside of the extension portion such that the shaft protrudes outside of the extension portion from a side surface of the extension portion, and a side surface of the head of the screw is exposed to a side of the extension portion including an upper surface and is rotatable by a user, wherein the extension portion is attached to the body portion by the screw being screwed into the screw hole on the side surface of the body portion;

wherein the extension portion is a pen holder that holds an electronic pen, and the extension portion includes a top plate including a recessed portion that holds the electronic pen, wherein a housing portion of a core body of the electronic pen is on a lower side of the top plate, and wherein the top plate is removable.

2. The position input apparatus according to claim 1, wherein, when the extension portion is attached to the body portion, the operation surface of the body portion and the upper surface of the extension portion are positioned on a same plane, and the side surface of the head of the screw does not protrude from the upper surface of the extension portion.

3. The position input apparatus according to claim 1, wherein a diameter of the head of the screw is less than or equal to 80 percent of a length the side surface of the body portion in the direction intersecting the operation surface.

4. The position input apparatus according to claim 1, wherein a diameter of the shaft of the screw is less than or equal to ¼ inches.

5. The position input apparatus according to claim 1, wherein a length of a part of the shaft of the screw protruding outside of the extension portion from the side surface of the extension portion is less than or equal to a thickness of the side surface of the body portion in a direction parallel to the operation surface.

6. The position input apparatus according to claim 1, wherein a length in an axial direction of the shaft of the screw is equal to or smaller than 4.5 mm.

7. The position input apparatus according to claim 1, wherein a display element is installed on the body portion, and the position detection sensor is on a front surface of a display screen of the display element or on a back surface of the display screen of the display element.

8. The position input apparatus according to claim 1, wherein the extension portion mounts and holds an article or includes an extended function.

9. The position input apparatus according to claim 1, wherein the extension portion is a pen holder that holds an electronic pen.

10. The position input apparatus according to claim 1, wherein the extension portion is a pen holder that holds an electronic pen, and the extension portion includes a recessed portion that holds the electronic pen.

* * * * *